(12) United States Patent
Preston et al.

(10) Patent No.: US 8,027,891 B2
(45) Date of Patent: Sep. 27, 2011

(54) INTERACTIVE ONLINE SPENDING ANALYSIS TOOL

(75) Inventors: Patricia Preston, New York, NY (US); Janet L. Bernacki, St. Peters, MO (US)

(73) Assignee: MasterCard International, Inc., Purchase, NY (US)

( * ) Notice: Subject to any disclaimer, the term of this patent is extended or adjusted under 35 U.S.C. 154(b) by 96 days.

(21) Appl. No.: 12/337,176

(22) Filed: Dec. 17, 2008

(65) Prior Publication Data

US 2010/0153242 A1 Jun. 17, 2010

(51) Int. Cl.
*G07B 17/00* (2006.01)
*G07F 19/00* (2006.01)

(52) U.S. Cl. ........................................................ 705/30

(58) Field of Classification Search .................... None
See application file for complete search history.

(56) References Cited

U.S. PATENT DOCUMENTS

| | | | |
|---|---|---|---|
| 5,842,185 A | 11/1998 | Chancey et al. | |
| 5,920,848 A * | 7/1999 | Schutzer et al. | 705/42 |
| 5,947,526 A | 9/1999 | Neu | |
| 6,115,458 A | 9/2000 | Taskett | |
| 6,163,776 A | 12/2000 | Periwal | |
| 6,430,542 B1 * | 8/2002 | Moran | 705/36 R |
| 7,389,915 B1 | 6/2008 | Dyor | |
| 7,406,445 B1 | 7/2008 | Silverbrook et al. | |
| 2002/0010612 A1 | 1/2002 | Smith et al. | |
| 2002/0099635 A1 | 7/2002 | Guiragosian | |
| 2002/0138428 A1 | 9/2002 | Spear | |
| 2003/0097331 A1 | 5/2003 | Cohen | |
| 2004/0158524 A1 | 8/2004 | Anderson et al. | |
| 2004/0225603 A1 | 11/2004 | Allen et al. | |
| 2004/0260633 A1 | 12/2004 | Lee | |
| 2005/0203885 A1 | 9/2005 | Chenevich et al. | |
| 2006/0151598 A1 | 7/2006 | Chen et al. | |
| 2006/0184430 A1 | 8/2006 | Gavarini | |
| 2006/0224475 A1 | 10/2006 | Kramer et al. | |
| 2007/0055597 A1 | 3/2007 | Patel et al. | |
| 2007/0088641 A1 | 4/2007 | Aaron et al. | |
| 2007/0185791 A1 | 8/2007 | Chan et al. | |
| 2007/0192222 A1 | 8/2007 | Mika et al. | |
| 2007/0235524 A1 | 10/2007 | Little | |
| 2007/0288373 A1 | 12/2007 | Wilkes | |
| 2008/0228615 A1 | 9/2008 | Scipioni et al. | |
| 2008/0228637 A1 | 9/2008 | Scipioni et al. | |
| 2008/0228638 A1 | 9/2008 | Scipioni et al. | |
| 2009/0037461 A1 | 2/2009 | Rukonic et al. | |

\* cited by examiner

*Primary Examiner* — Ryan Zeender
*Assistant Examiner* — Paul Danneman
(74) *Attorney, Agent, or Firm* — Hoffmann & Baron, LLP

(57) ABSTRACT

Embodiments of the present invention are directed to interactively displaying account activity. An analysis of financial transactions associated with a financial unit can be performed by a spending analysis tool, which can display the analysis via a website. The analysis can include, for example, a spending analysis and a budget analysis. The financial transactions are associated with merchants. At least one of the financial transactions is associated with first merchant, a first merchant category, and a member of the financial unit. The spending analysis tool changes the merchant category associated with the at least one of the financial transactions to another merchant category based on a selection of a user.

17 Claims, 19 Drawing Sheets

FIG. 2

Spending Analysis Tool

BANK ABC

Step 1  Step 2  Step 3

Personal and Account Information — 210

First Name: *
Last Name: *
Address: *
City: *
State: *
Email: *
Card Number: *

* required field — 220

[Next>>]

Merch. Car Gas Serv. Health Travel Lodging Restaur.

⊠ Budgeted   ⊠ Spending Within Budget

LOGIN

User Name:
Password:

Forgot Password?

[LOGIN]

BANK ABC

Spending Analysis Tool

300

LOGIN

User Name: [    ]
Password: [    ]

Forgot Password?

[LOGIN]

Step 1   Step 2   Step 3

Security Profile Information

310

User Id: * [    ]
Password: * [    ]
Verify Password: * [    ]

Security Question: * [What is your mother's maiden name? ▷]
Answer: * [    ]

Security Question: * [What is your mother's maiden name? ▷]
Answer: * [    ]

* required field

[<<Previous]   [Next>>]

Merch. Car Gas Serv. Health Travel Lodging Restaur.

☐ Budgeted   ☒ Spending Within Budget

Contact Us   FAQs   Term & Conditions   Links

FIG. 4

Spending Analysis Tool — BANK ABC

LOGIN

User Name: ☐
Password: ☐

Forgot Password?

[LOGIN]

Step 1    Step 2    Step 3

Account and User Setup

You have 2 debit cards associated with your account

Manage Users       Assign Cards

| Amy  |   | xxxx-xxxx-xxxx-1234  Amy ▷ |
| John |   | xxxx-xxxx-xxxx-5678  John ▷ |

[    ]  [Add]

Once registered you can modify and/or add users from My Account

Merch. Car Gas Serv. Health Travel Lodging Restaur.

☒ Budgeted    ☒ Spending Within Budget

* required field    [<<Previous]    [Next>>]

Contact Us    FAQs    Term & Conditions    Links

Welcome, John
- Home — 512
- Spending Analysis — 602
- By Category — 604
- Over Time — 606
- By Month
- Transaction Detail — 608
- Budgeting — 514
- Budget Analysis — 516
- My Account — 518
- Log Out Spending Analysis Tool — 1100

BANK ABC

⊘ By Category  ✕ Over Time  ▦ By Month  ▨ Transaction Detail — 1105

From: Sept 2007 ▷   To: Aug 2008 ▷   Name: All ▷   Card: All ▷   Category: All ▷
        630              632              634           636          1160
       1110             1110             1110          1110         1110

| Date | Merchant | Location | Category | Card# | Amount | Name | Rules |
|---|---|---|---|---|---|---|---|
| 2008/08/08 | freds bbq | ANYTOWN MO | Travel ▷ | 1234 | $123.45 | John ▷ | 🗔 |
| 2008/08/08 | freds bbq | ANYTOWN MO | Travel ▷ | 1234 | $123.45 | John ▷ | 🗔 |
| 2008/08/08 | beehive | ANYTOWN MO | Restaurant ▷ | 1234 | $97.63 | John ▷ | 🗔 |
| 2008/08/08 | beehive | ANYTOWN MO | Restaurant ▷ | 1234 | $16.61 | John ▷ | 🗔 |
| 2008/08/08 | 10plex theater | ANYTOWN MO | Restaurant ▷ | 1234 | $16.61 | John ▷ | 🗔 |
| 2008/08/08 | 10plex theater | ANYTOWN MO | Restaurant ▷ | 1234 | $251.24 | John ▷ | 🗔 |
| 2008/08/08 | Hertz | ANYTOWN MO | Restaurant ▷ | 1234 | $251.24 | John ▷ | 🗔 |
| 2008/08/08 | Hertz | ANYTOWN MO | Restaurant ▷ | 1234 | $100.00 | John ▷ | 🗔 |
| 2008/08/08 | some ATM | ANYTOWN MO | | | | | |

1130                                    1140

Total: $5,725.50 — 1114

Save Changes — 1150

Combined Budget  BA: By Category  Budg. Anal.(MTD)  Budg. Anal.(Quar)  Profile Setup
General Prefs.  Rules Manage. — 650

FIG. 15

| Category | Jun Budg | June Spend | June Diff | Jul Budg | Jul Spend | Jul Diff | Aug Budg | AugSpend | Aug Diff |
|---|---|---|---|---|---|---|---|---|---|
| Restaurant | $100.00 | $50.00 | $50.00 | | $400.00 | | $600.00 | $600.00 | -$400.00 |
| Gas/Auto | | $70.00 | | | $445.00 | | $600.00 | | |
| Groceries | $6,000.00 | $80.00 | $5,920.00 | | $100.00 | | $0.00 | $6350.00 | $350.00 |
| Merchandise | | $100.00 | | | $200.00 | | $0.00 | | |
| Entertainment | | $120.00 | | | $120.00 | | $250.00 | $500.00 | $250.00 |
| Utilities | | $320.00 | | | $220.00 | | $0.00 | | |
| HealthCare | | $60.00 | | | $160.00 | | $0.00 | | |
| Services | | $90.00 | $555.00 | | $190.00 | $365.00 | $0.00 | | |
| Travel | | $40.00 | | | $140.00 | | $0.00 | | |
| Cash | | $150.00 | | | $250.00 | | $150.00 | | |
| Custom1 | | $80.00 | | | $100.00 | | $0.00 | | |
| Custom2 | | $30.00 | | | $130.00 | | $0.00 | | |
| Total | $6,100.00 | $1,190.00 | $5,970.00 | $555.00 | $2615.00 | $365.00 | $1,050.00 | $1,600.00 | $200.00 |
| % od Diff | | | 98% | | | 66% | | | 19% |

INTERACTIVE ONLINE SPENDING ANALYSIS TOOL

BACKGROUND

Conventionally, credit card and debit card holders receive paper account statements via the mail. In recent years, account statements have become available on the Internet, allowing card holders to access their account statements online. Under this approach, card holders are able to access their account statements at anytime and from any location having a computing terminal and an Internet connection. Typically, account websites provide the card holder with an account summary that display purchases "to date" and allows card holders to view their purchase history. Card holders can also pay for credit card purchases through these account websites and can, in some instances initiate, an automatic payment of the amount owed. However, these account websites are limited in functionality and typically do not provide the card holder with flexibility to manage their accounts and purchases.

SUMMARY OF THE INVENTION

Embodiments of the present invention are directed to a method, system including one or more servers, and medium comprising instructions for interactively displaying account activity. Embodiments of the present invention display an analysis of financial transactions associated with a financial unit via a website. The financial transactions are associated with merchants, and at least one of the financial transactions is associated with a first merchant, a first merchant category, and a member of the financial unit. The financial transactions are at least one of a signature transaction and a pin transaction.

Embodiments of the present invention also facilitate changing the first merchant category associated with the at least a first one of the financial transactions to a second merchant category based on a selection by a user. The first merchant can be associated with the second merchant category for subsequent financial transactions involving the first merchant. In some embodiments, a member associated with the at least a second one of the financial transactions can be changed so that a different member of the financial unit is associated with the financial transaction based on a selection of the user.

Embodiments of the present invention can include a filter to filter to the financial transactions. The filter can limit the financial transactions being used in the analysis to a subset of the financial transactions that are associated with at least one of a member of the financial unit, a selected merchant, a period of time, a card number associated with the account, and the like.

Budget information can be received from the user, where the budget information can identify a desired amount of spending by at least one of the financial unit, at least one member of the financial unit, and categories of merchants and the embodiments of the present invention can determine whether spending is over or under a budget defined by the budget information.

The financial transactions can be exported to at least one of a financial management application, spread sheet application, word processor application, document viewer application, and the like.

The preferred embodiments of the present invention, as well as other objects, features and advantages of the present invention will be apparent from the following detailed description, which is to be read in conjunction with the accompanying drawings. The scope of the invention will be pointed out in the claims.

BRIEF DESCRIPTION OF THE DRAWINGS

FIGS. 2-18 are illustrative Graphical User Interfaces (GUIs) for implementing embodiments of the present invention.

DETAILED DESCRIPTION

Embodiments of the present invention are directed to spending analysis tool for debit and/or credit card holders to provide added value to the credit and/or debit card (hereinafter collectively referred to a "card" unless explicitly stated), such as for example, features that assist the users with controlling their spending. The spending analysis tool can enable users to view signature and pin transaction details and summaries by, for example, week, month, month-to-date, year, year-to-date, merchant category, and the like. The tool can allow a user to enter budget information and compare their budget to actual expenditures. Information accessed using the spending analysis tool can be exported from the spending analysis tool to a data processing application, such as financial management applications, spread sheet applications, and the like, and/or to other applications, such as word processor applications, document viewer applications, and the like.

Figure 1:
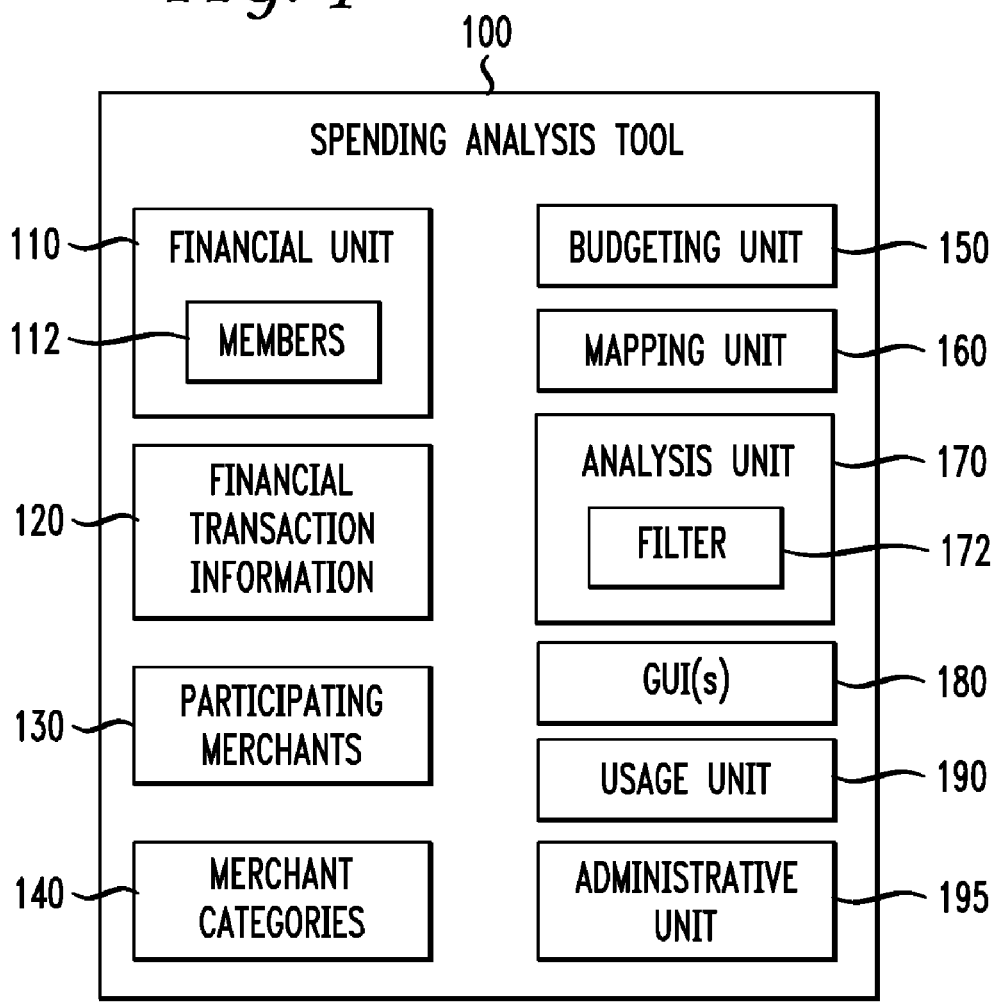
FIG. 1 is a block diagram illustrating an exemplary interactive spending analysis tool.

FIG. 1 is a block diagram of a spending analysis tool 100 (hereinafter "tool 100") that provides an online, interactive financial management application for card transaction details. The tool 100 can include a financial unit 110, financial transaction information 120, participating merchants 130, merchant categories 140, budgeting unit 150, mapping unit 160, analysis unit 170, and one or more graphical user interfaces 180 (hereinafter "GUIs 180").

The financial unit 110 can be formed of one or more members 112, such as members of a household, employees of a business, and the like. In some embodiments, a member can be an entity, such as a side business so that the financial unit 110 can include both people and businesses or other entities. The members 112 of the financial unit 110 can be added to, or deleted from, the financial unit 110, as desired. Some or all of the members can have a card from an issuer such that the members can be associated with their credit card and/or debit card, for example, by using a number on the card. In some embodiments, members can be added to the financial unit without associating them with card number. In some embodiments, members 112 of the financial unit 110 can access the tool 100. In other embodiments, one or more of the members 112 can control access such that only selected members 112 can access the tool 100. Members 112 that have access to the tool are referred to herein as users. Access to the tool 100 can require users to login using a user name and password, or other suitable security features can prevent unauthorized access to the tool 100.

Financial transaction information 120 can be made available by the tool 100 to users. Financial transaction information 120 can include purchases, withdrawals (e.g., ATM withdrawals), or other account activities associated with one or more of the member's card use including signature and pin transactions (hereinafter collectively referred to as "financial transactions"). The tool 100 can maintain a financial transaction history of the financial transactions for a specified time frame. For example, the tool can maintain a financial transaction history for the last month, year, two years, five years, etc. The financial transaction can be attributed to the member of the financial unit 110 that facilitated the financial transaction.

The financial transactions can include participating merchants 130. Participating merchants 130 (hereinafter "merchants 130") refer to merchants that accept the card issued by the issuer as a payment method. The merchants can have one or more locations including physical locations (e.g., Street, City, State) and/or Internet locations (e.g., Uniform Resource Locators (URLs)).

The merchants 130 can be associated with merchant categories 140. The merchant categories 140 can provide a description about the goods or services the merchants 130 offers. Some examples, of merchant categories include merchandise, restaurant, grocery, travel, cash, services, gas/automotive, health care, entertainment, utilities, and the like, as well as custom user defined categories. When one of the members 112 of the financial unit 110, for example, purchases an item from one of the merchants 130, the tool can associate a merchant and a merchant category 140 with the financial transaction so that users can have a general description about purchases made by the members 112. In some embodiments, the merchant categories 140 can be modified by the users such that merchant categories 140 can be dynamically assigned to the merchants 130. In other embodiments, some of the merchant categories 140 can be statically assigned to the merchants 130 so that no changes can be made. In yet other embodiments, the user can modify the assignment of merchant categories 140 to merchants based on a limited subset of merchant categories 140 provided by the tool 100.

The budgeting unit 150 of the tool 100 can maintain a budget based on budget information input by the users. The budget can be specified for one or more of the individual members 112 of the financial unit 110, for the entire financial unit 110, a group of the members 112 of the financial unit 110, and the like. The budget can be defined by the user to estimate spending associated with a time period, such as a week, month, year, etc., and/or can be specific to one or more merchant categories 140.

The mapping unit 160 can be used to form associations of information. For example, the mapping unit can be used to associate a member 112 of the unit with a card number so that when the member uses the card the tool 100 identifies the member as a party in the financial transaction. Likewise, the mapping unit 160 can associate a merchant category 140 with one or more merchants 130 to identify the merchant category 140 for a financial transaction involving the one or more merchants 130. The mapping unit 160 can also be used to associate members 112 with the financial unit 110. Mappings formed using the mapping unit 160 can be performed by the tool 100 and/or by users of the tool 100. As such, the tool 100 provides an interactive environment in which users can customize the relationship of information with other information to flexibly accommodate the users.

The analysis unit 170 can perform an analysis of the information maintained by the tool 100. For example, the analysis unit 170 can be used to format the information in different ways. A filter 172 can be applied to the information so that the financial transactions used by the analysis unit 170 are limited to a subset of the financial transactions. For example, the analysis unit 170 can generate a list of financial transactions according to the date and time the financial transactions occurred and can provide a sum of the financial transactions by category, member, financial unit 110, or can compute an overall some for all financial transactions occurring in a selected time frame, such as a week, month, year, etc. The analysis unit 170 can generate various graphs, such as line graphs, bar graphs, pie charts, and the like, which can be used to depict information to the users.

In some embodiments, the analysis unit 170 can generate a projected sum to predict an amount of spending that may occur in a selected time frame. For example, the analysis unit 170 can use information associated with financial transactions for one or more months and can generate a projected yearly spending based on the financial transactions of the one or more months. The projected spending can be computed for one or more merchant categories 140, one or more members 112, and/or for the entire financial unit 110.

The analysis unit 170 can analyze the financial transactions to generate a spending analysis, which can be presented to the user in various formats. The analysis unit 170 can analyze the financial transaction and the budget to determine whether the budget is being met and can identify an amount spending over or under the budget 150. The analysis unit 170 can parse the spending analysis and budget analysis based on the merchant categories 140 and/or one or more members 112 of the financial unit 110. This allows the user to customize the analysis so that the user can identify issues, such as fraud, overcharges, and the like; spending habits of the financial unit 110, or members 112 thereof; budget adjustments; and the like.

The GUIs 180 can provide an interactive display for users accessing the tool 100. GUIs 180 can be used to depict financial transaction information to users and allow user to control various mappings. For example, once a user has logged into the tool 100 one of the GUIs 180 can provide an interface for managing which members 112 are included in the financial unit 110, and other GUIs 180 can display an analysis to the user to allow the user to view financial transactions and the members 112, merchants 130, merchant categories 140, and the like, associated with the financial transactions. The GUIs 180 can provide an interface to allow a user to change the mapping between merchants, merchant categories, and/or member 112, and to generate an analysis of the budget. The GUIs provide a visual context for the user, while other components of the tool 100 can operate in the background based on selection made in the GUIs 180.

The usage unit 190 can track information about the usage of the tool 100 and can generate reports. The reports can be viewed by the users and/or the issuer of the cards providing tool 100. The reports can include information, such as how often the tool 100 has been accessed, when the tool has been accessed, which user accessed the tool, what mapping changes have been entered, and the like. The reports can be used as a security feature so that the users and/or the issuer can be alerted of any suspicious behavior.

The administrative unit 195 allows the issuer of the cards to access the tool 100 to provide support and customer service to the users. The administrative unit can allow the issuer to reset user names, passwords, and mapping, and can allow the issuer to update information in the tool, such as new replacement card numbers.

FIGS. 2 and 3 show an exemplary web-based GUI 200 and web-based GUI 300, respectively, for illustrating a registration process of the tool 100. A user can register with the tool 100 to gain access to account information maintained, and analysis performed, by the tool 100. The GUI 200 (FIG. 2) includes data entry fields 210 for receiving information from the user and can include, for example, the user's first name, last name, address, e-mail address, card number, and the like. After the user enters this information, the user can select the next button 220 to proceed with the registration process. The GUI 300 (FIG. 3) allows the user to set up a security profile to prevent unauthorized access of the user's account information. The GUI 300 can include data entry fields 310 for receiving security information from the user including, for example, a user ID field, a password field, a password verification field, security question and answer fields, and the like.

The user can manage the financial unit by adding, deleting, or editing member information of the financial unit. FIG. 4 is an exemplary web-based GUI 400 that shows a financial unit management interface during registration. In some embodiments, the tool 100 can identify members that are added to the financial unit by default based on the account information entered by the user during the registration process. The GUI 400 can allow user to map card numbers to members so that financial transactions involving the card numbers are associated with specified members. In the present example, the financial unit includes two members "Amy" and "John", where Amy is associated with a card number having the last four digits of "1234" and John is associated with a card number having the last four digits of "5678".

Figure 5:
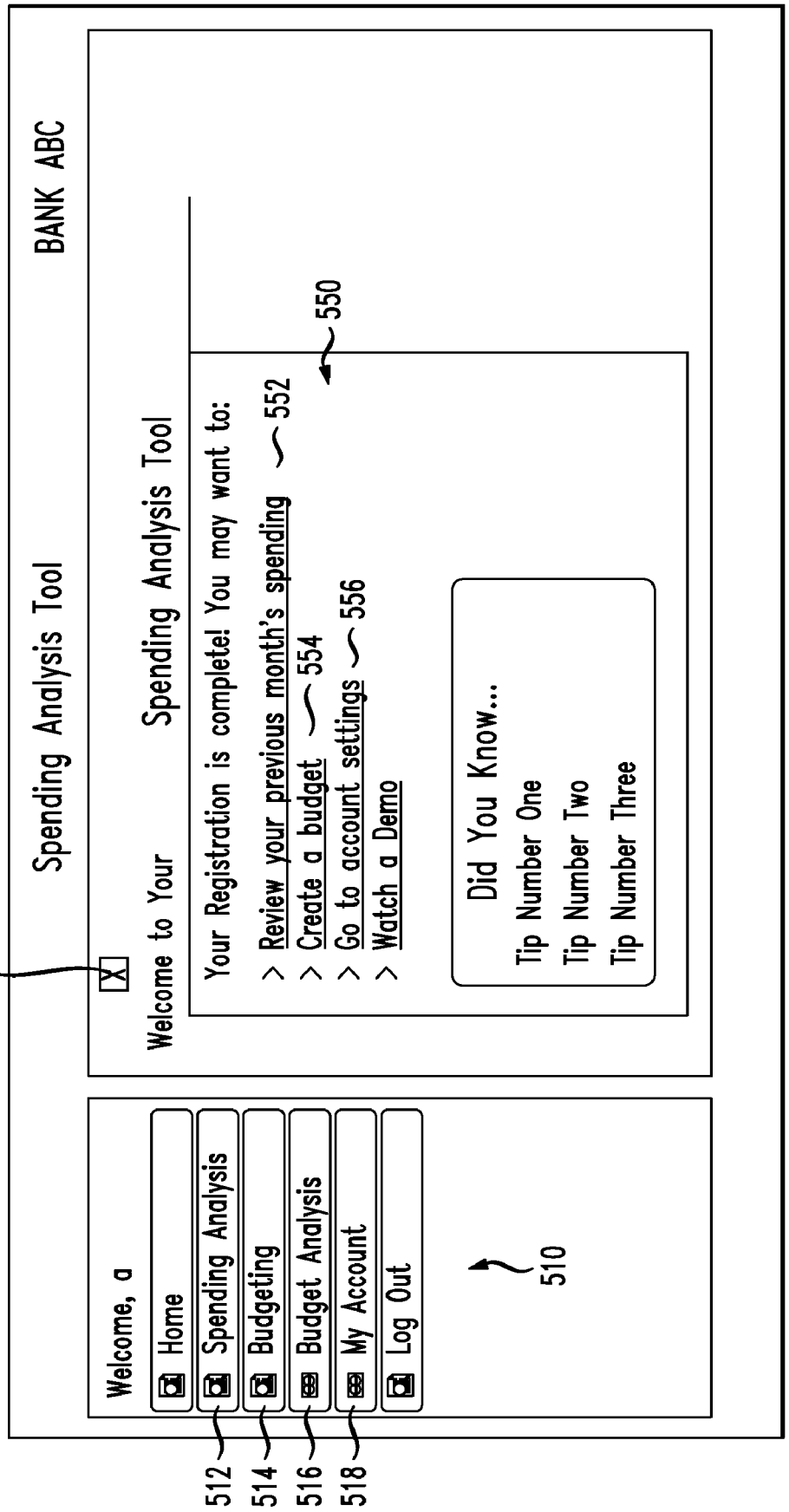
Figure 6:
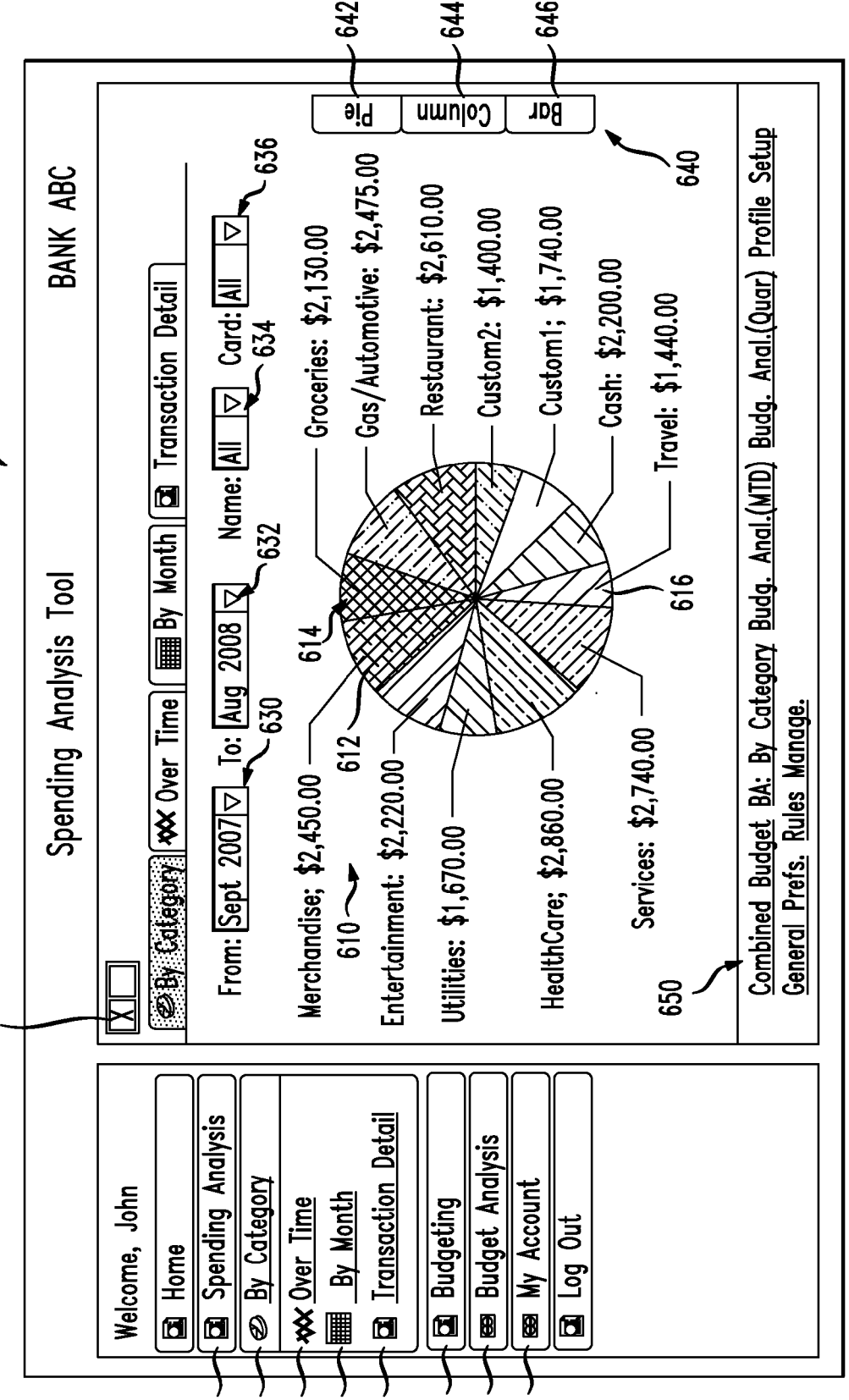

FIG. 5 is an exemplary web-based GUI 500 that shows a main interface having options 502, 510, and 550. The option 502 allows the user to export a spending analysis, a budget analysis, and/or raw financial transaction data to other applications, such as third party applications include financial management applications; spreadsheet applications; word processor application; document viewer application using, for example, portable document format (PDF) files, postscript format (PS) files, or other suitable formats; and the like. The options 510 can include a "spending analysis" option 512, a "budgeting" option 514, a "budget analysis" option 516, and a "my account" option 518. The options 550 can include a "review spending history" option 552, a "create budget" option 554, and an "account settings" option 556.

The spending analysis option 512 and the review spending history option 552 allow users to view financial transaction information. When a user selects the spending analysis option 512, a group of sub-options can be presented to the user to allow the user to select how financial transaction information is displayed by the tool 100. FIGS. 6-10 are GUIs that show different formats that the financial transaction information can be displayed to the user. The sub-options available to the user can include a "By Category" option 602, an "Over Time" option 604, a "By Month" option 606, a "Transaction Detail" option 608. The GUI 600 (FIG. 6) depicts a spending analysis based on a selection of the "By Category" option 602. The tool 100 can display a pie chart 610 of financial transactions based on the merchant category associated with the merchants involved in the financial transactions. The pie chart 610 can break the financial transactions into pie wedges that represent a cumulative amount for financial transactions by the merchant category.

For example, the pie chart can include a pie wedge 612 representing financial transactions involving merchants associated with a "merchandise" merchant category, a pie wedge 614 representing financial transactions involving merchants associated with a "groceries" merchant category, a pie wedge 616 representing financial transactions involving merchants associated with a "travel" merchant category, and the like.

The wedges (e.g., pie wedges 612, 614, 616) of the pie chart 610 can included embedded links to allow a user to select the a wedge of the pie chart using a data entry device, such as a mouse, to navigate to another view. For example, the user can select the pie wedge 612 and the transaction details of financial transaction associated with the merchant category "merchandise" can be displayed to the user.

The user can specify a time frame for which financial transaction information is to be displayed and can select members for which the financial transaction information can be displayed. For example, the GUI 600 can include a "From" selector 630, a "To" selector 632, a "Name" selector 634, and a "Card" selector 636. The "From" selector 630 can identifies a point in time after which financial transactions can be included in the spending analysis and the "To" selector can allow the user to choose a point in time before which financial transactions can be included. As a result, only financial transactions within the range specified by the "Form" and "To" selectors 630 and 632, respectively, are included in the pie chart 610. The "Card" selector 636 allows the user to choose which of the card numbers are included in the spending analysis. The "Name" selector 634 allows the user to choose which of the members of the financial unit are included in the spending analysis. For example, the user can choose to include some or all of the members of the financial unit in the spending analysis. Selectable links 650 can be provide to allow the user to navigate to other GUIs without requiring the user to click through the link structure provided by the options 512, 514, 516, 518.

Figure 7:
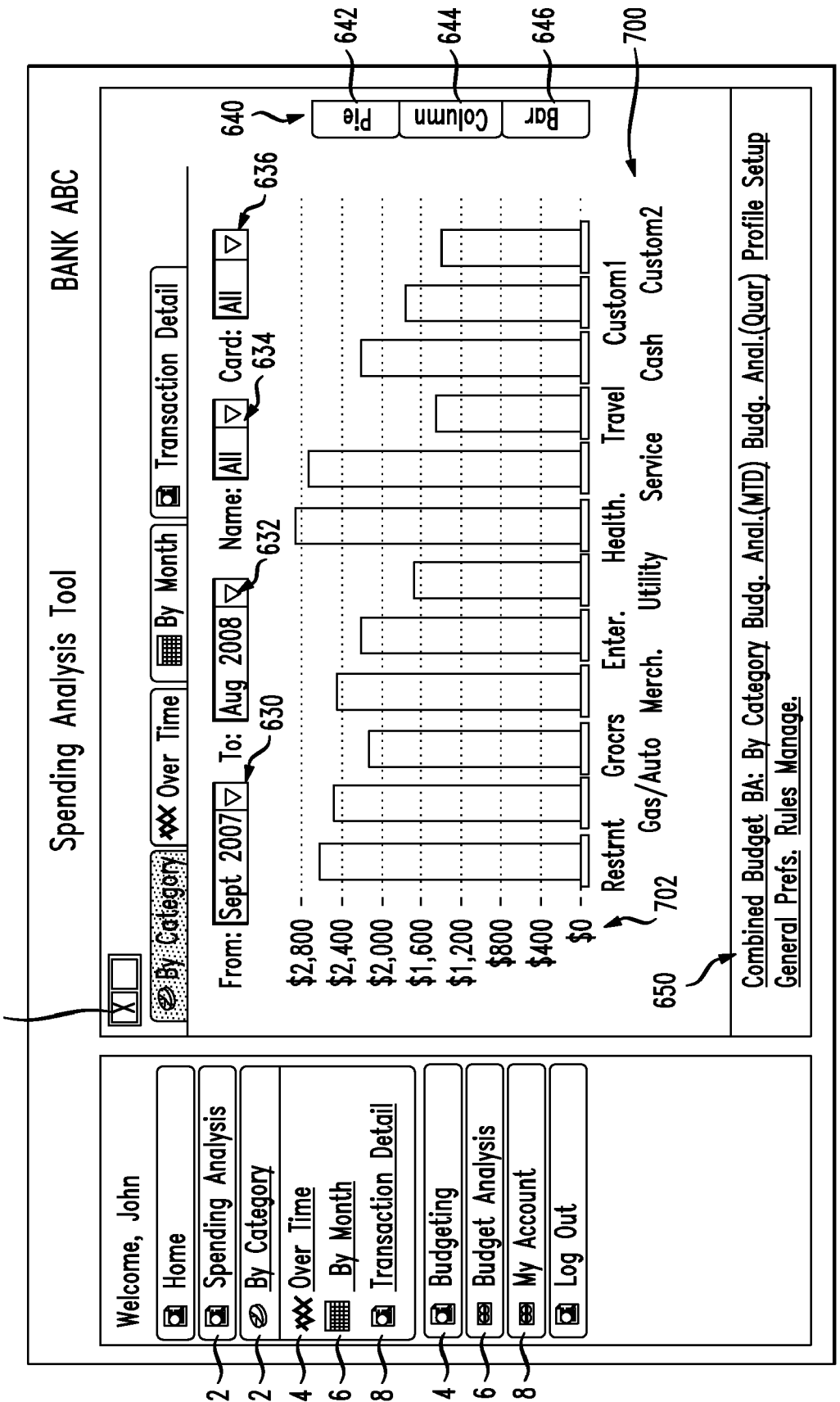
Figure 8:
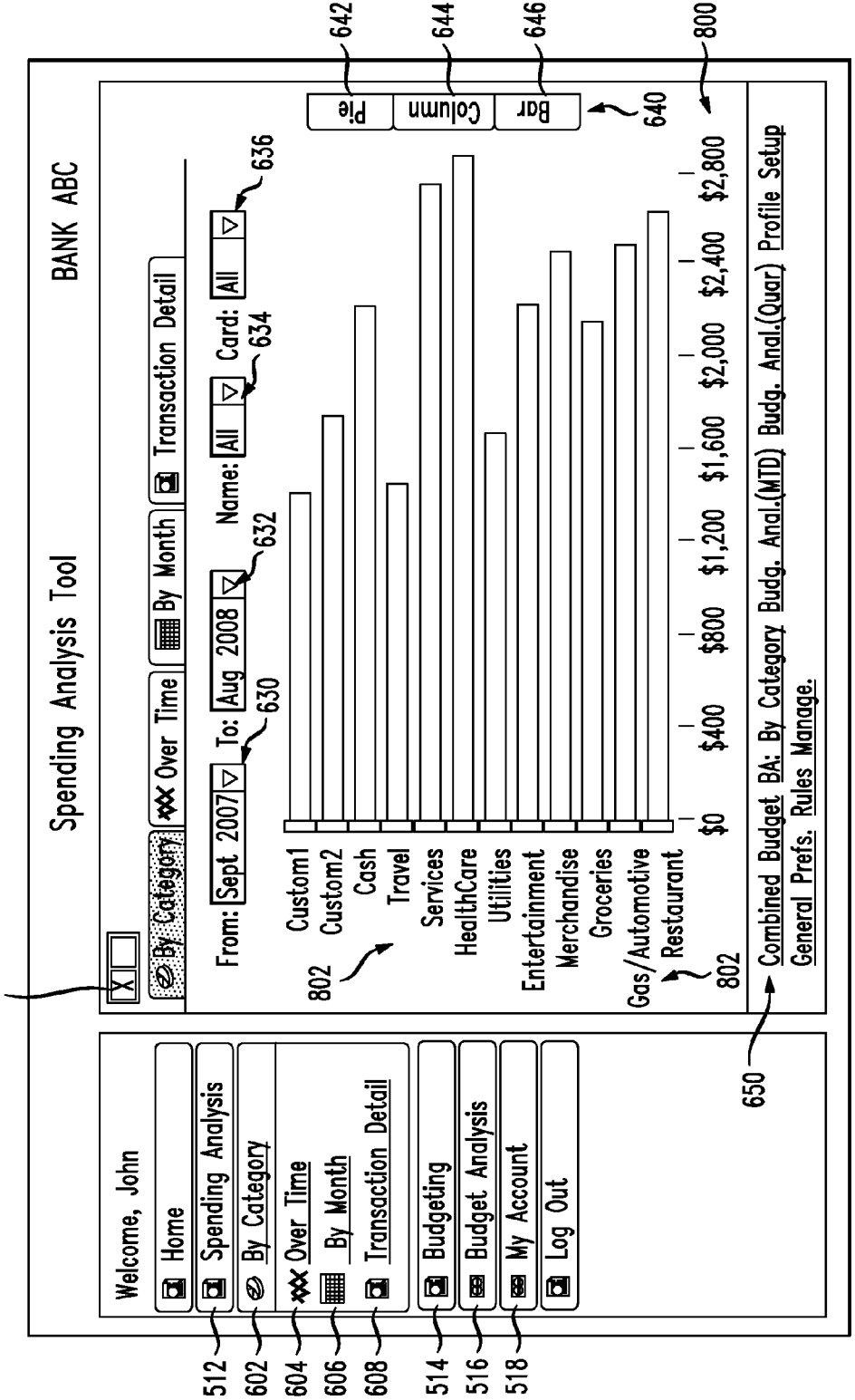

Other views can be generated for the "By Category" view. For example, the GUI 600 can include graphing options 640. The graphing options 640 can include a "pie chart" option 642, a "column graph" option 644, a "bar graph" option 646, and the like. FIG. 7 depicts the GUI 600 when the "column graph" option 642 is selected by the user. A horizontal axis 700 represents merchant categories and a vertical axis 702 represents an amount of spending. FIG. 8 depicts the GUI 600 when the "bar graph" option 646 is selected by the user. A horizontal axis 800 represents an amount of spending and a vertical axis 802 represents merchant categories.

The "By category" view allows to the user to readily discern how each merchant category contributes to the overall spending within a specified time period and for specified members. In the present example, the user can readily discern that the "Healthcare" merchant category contributed to most of the spending when all members of the financial unit are considered, while the "Custom2" merchant category, a user defined category, contributed the least to the spending when all the members of the financial unit are considered during the specified time frame.

Figure 9:
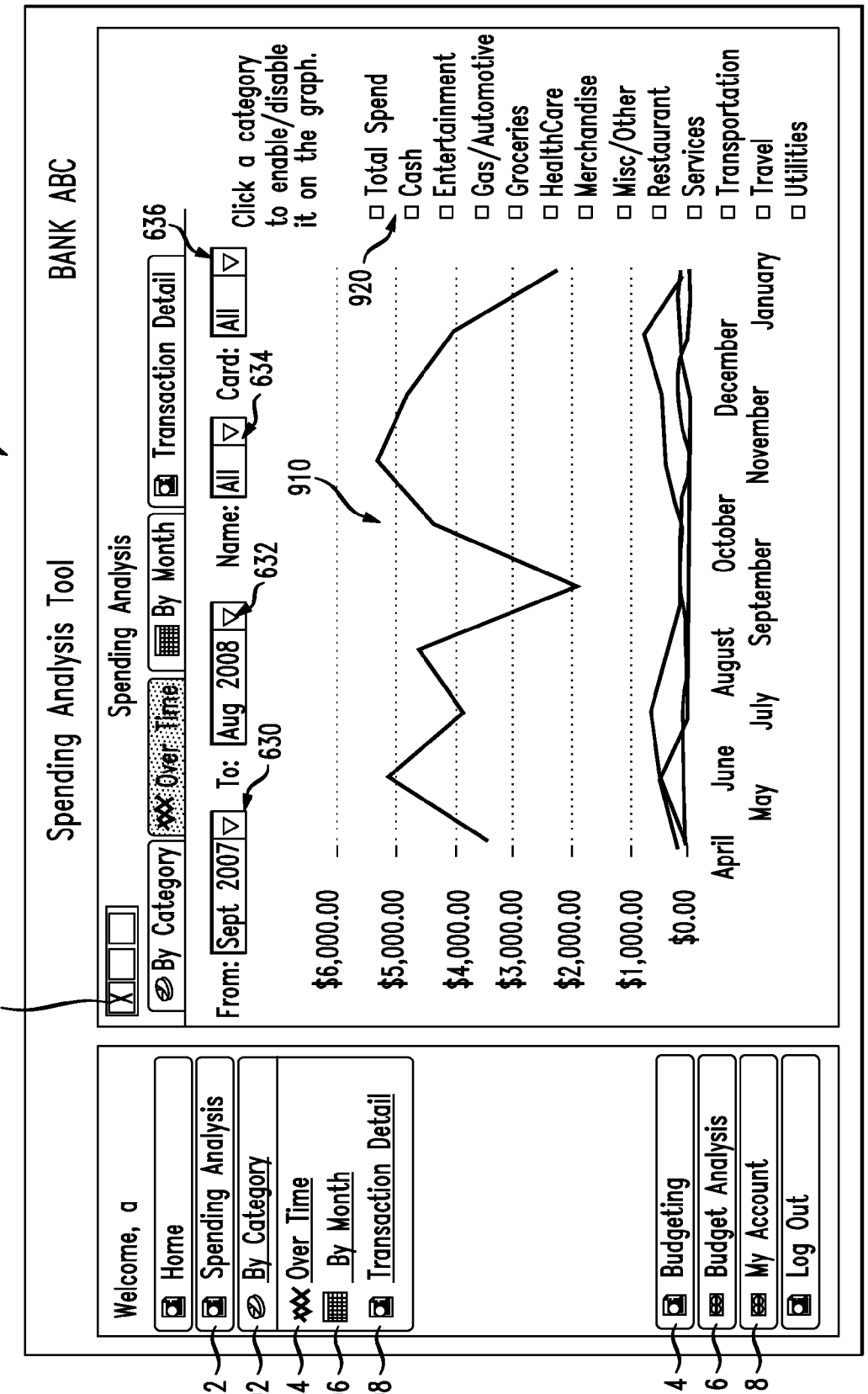

FIG. 9 is an exemplary web-based GUI 900 for illustrating the financial transaction information based on a selection of the "Over Time" option 604. The tool 100 can display a graph 910 of financial transactions, which can be a line graph, based on the financial transactions over a period of time. The graph 910 can break the financial transactions into different lines, where each line can represent a merchant category associated with the financial transactions. The GUI 900 can provide selectors 920 to allow users to control which categories are shown on the graph 900. For example, the user can select to graph the total spending, spending associated with the entertainment merchant category, healthcare merchant category, and the like.

The GUI 900 can include the "From" selector 630, the "To" selector 632, the "Name" selector 634, and the "Card" selector 636 to adjust the time period, the members, and/or the card numbers included in the spending analysis. Data points of the graph can be based on a cumulative amount of spending for each merchant category for a given day, week, month, year, etc. In some embodiments, the user can select to break the financial transaction into lines that represent the members of the financial unit associated with the financial transactions, rather than the category associated with the financial transaction. This can allow the user to identify which members are spending the most on a daily, weekly, monthly, yearly, etc., basis.

Figure 10:
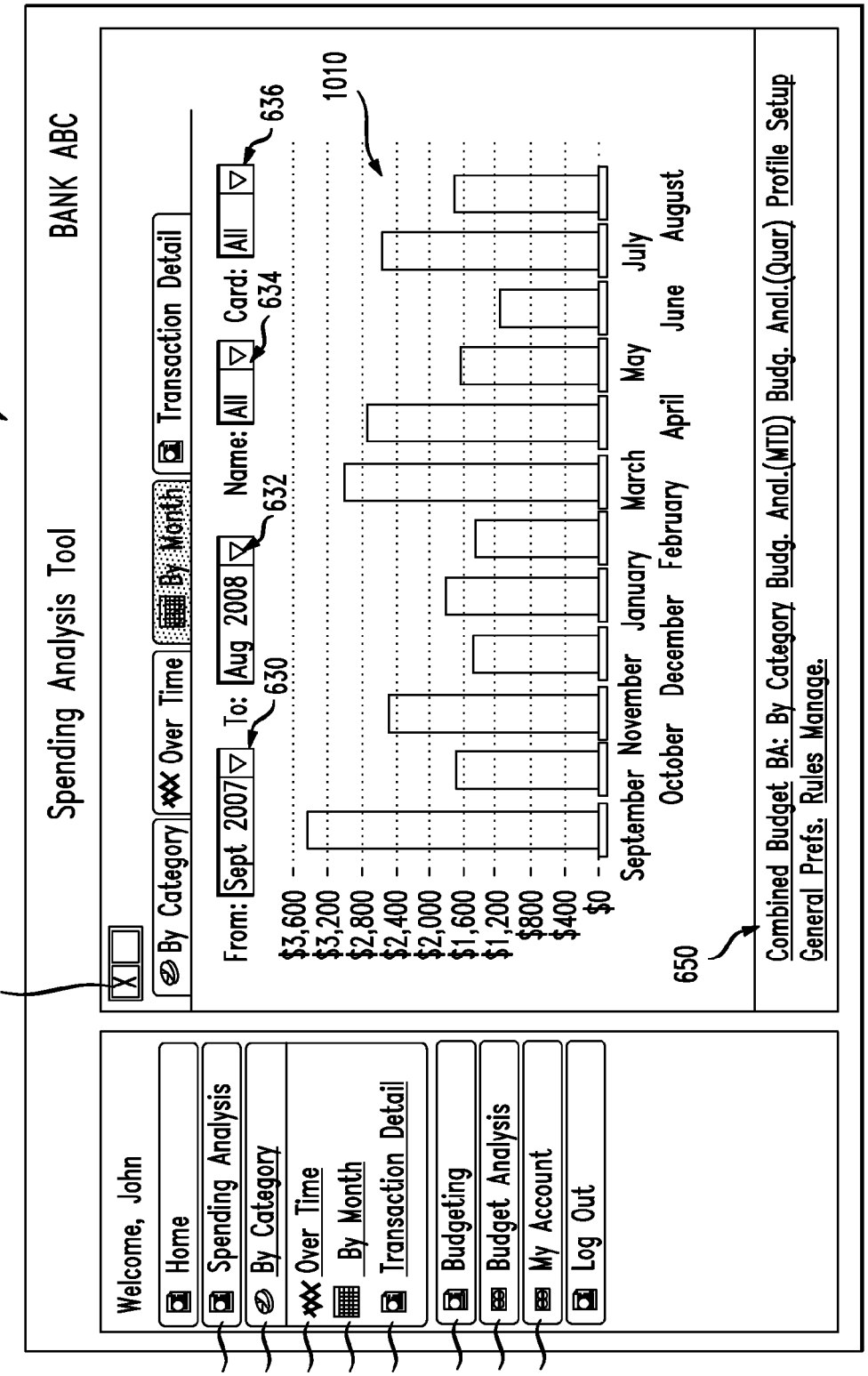

FIG. 10 is an exemplary web-based GUI 1000 that shows a spending analysis of the financial transactions when the "By Month" option 606 is selected. The spending by month spending analysis can include a graph 1010, which in the present example is a column graph that includes the amount of spending on a y-axis and the month of the year on the x-axis. The user can limit the transaction being displayed to transactions between specified dates and can choose which of the members of the financial unit can be included in the analysis using the "From" selector 630, the "To" selector 632, the "Name" selector 634, and the "Card" selector 636 discussed above. In some embodiments, the graph 1010 can identify the contribution of the individual members of the financial unit to the overall spending for each month.

FIG. 11 is an exemplary web-based GUI 1100 for illustrating the financial transaction information based on a selection of the "Transaction Detail" option 608. The tool 100 can display a list 1105 of financial transactions based on the financial transactions in an order that can be based on the date of the financial transaction, the merchant involved in the financial transaction, the location of the financial transaction, the category of the financial transaction, a member associated with the financial transaction, and the like. The user can select the order of the financial transactions by selecting headings 1110.

For example, the user can select the "date" heading 1112 to arrange the financial transactions according to the date the financial transactions occurred and can choose to list them in ascending or descending order. The list 1105 can include the date, the merchant name, the merchant location, the merchant category, the amount, and the card holder associated with the financial transaction.

The financial transactions included in the Transaction Detail can be filtered using the selectors 630-636 so that only financial transactions satisfying the parameters of the selectors 630-636 are displayed to the user. The GUI 1100 can include a total spend field 1114 that displays the cumulative amount spent for the financial transactions within a range specified using selectors 630 and 632, and for a member and/or card number specified using selectors 634 and 636. The GUI 1100 can also include a category selector 1160 that allows the user to control which categories are included in the list 1105. In the present example, all of the categories are included in the list.

The merchant category and the member associated with the financial transactions can be modified by the user so that a different merchant category or a different member can be associated with the financial transaction. For example, selectable fields 1120 can be used for the merchant categories and members and the user can select these selectable fields 1120 to change the associations of the financial transaction. In one example, the user can select a selectable field 1130 corresponding to a merchant category assigned to a financial transaction. The tool can list the merchant categories that can replace the merchant category and the user can select the desired merchant category from the list to replace the existing merchant category. Upon selection of the desired merchant category, the desired merchant category is associated with the merchant of the financial transaction.

In another example, the user can select a selectable field 1140 associated with a member assigned to another financial transaction. Upon selection of the selectable field 1140 a list of possible members can be displayed to the user and the user can select a different member to associate with the financial transaction. When the user selects the different member, the different member is assigned to the financial transaction.

To save the modifications, the user can select a "Save" option 1150, which saves the modifications. Thereafter, when the user views the financial transactions with modified associations, the modifications are displayed. In some embodiments, the user can receive a paper statement in the mail summarizing account activity and the statement can include the modifications. The paper statement can note what modifications were made. In some embodiments, modifications made to the associations can become permanent after a specified time period, such as a number of months (e.g., 3 months) after the modification has been made.

The modification can be applied prospectively to subsequent financial transactions or can be applied only for the modified financial transactions. In some embodiments, the modification of a merchant category can be specified for a specific merchant location such that subsequent financial transactions at the specified merchant location are associated with a modified category, such as health care, and financial transactions at other locations of the merchant remain associated with a previously associated category, such as merchandise.

Figure 12:
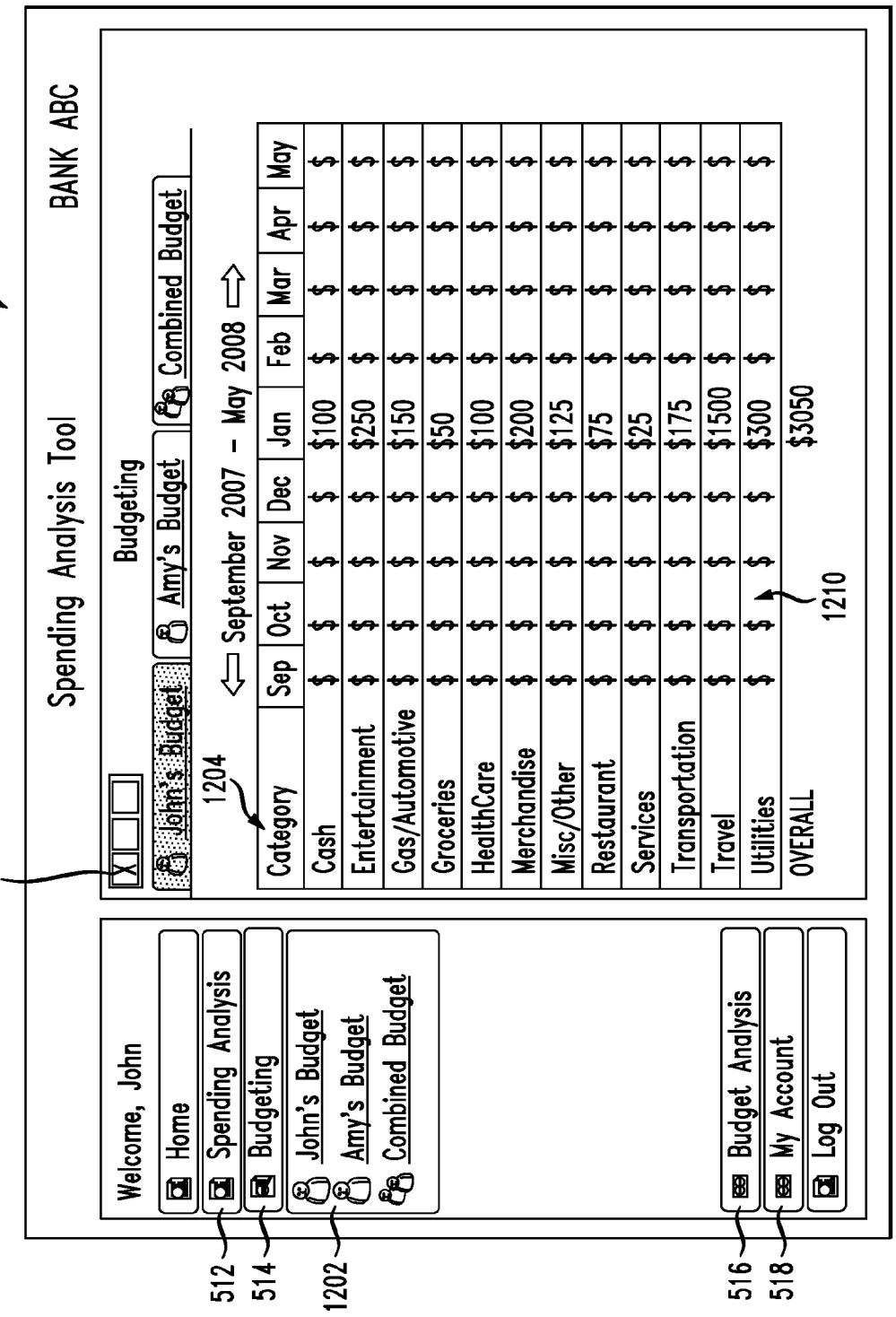

The budgeting option 514 (FIG. 5) allows users to view generate and manage a budget for members of the financial unit as well as for the financial unit as a whole. When a user selects the budgeting option 514, a group of sub-options can be presented to the user to allow the user to select how financial transaction information is displayed by the tool 100. FIG. 12 is an exemplary web-based GUI 1200 for illustrating the budgeting based on a selection of a budget option 1202. The budget can be divided by merchant categories such that the user can define a budget for the merchant categories by entering an amount for a list 1204 of individual merchant categories in designated fields 1210. The budget can be specified for a selected time period, such as daily, weekly, monthly, yearly, and the like. In the present invention, the budget is specified for a monthly budget and the budget is defined for each merchant category. The budget can compute an overall budget 1220 based on the amounts entered for the merchant categories. In some embodiments, the user can specify the overall budget without specifying a budget for individual categories.

Figure 13:
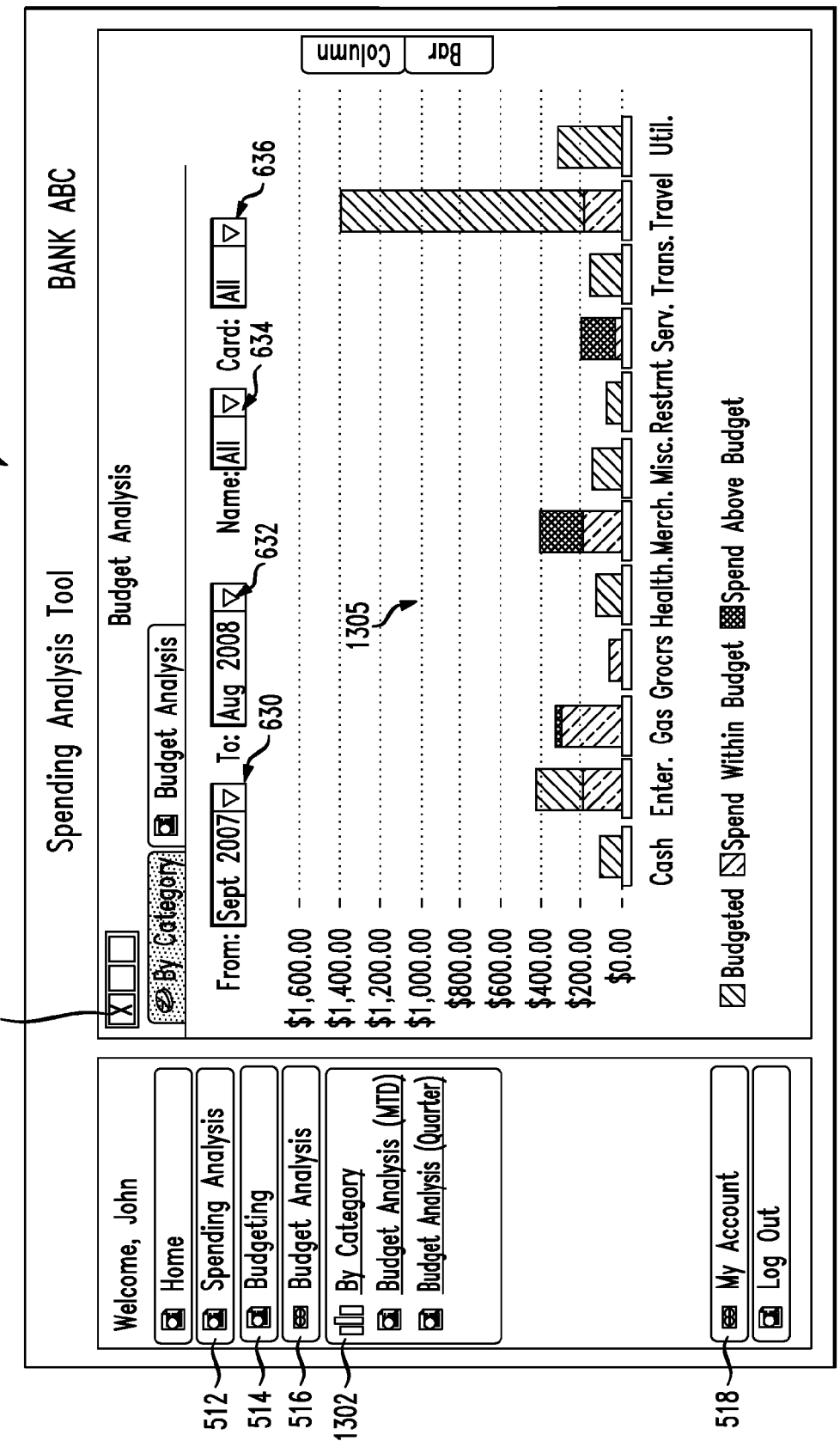

The budget analysis option 516 (FIG. 5) provides an analysis of the budget for members of the financial unit as well as for the financial unit as a whole. When a user selects the budget analysis option 516, a group of sub-options can be presented to the user to allow the user to select how the budget analysis is displayed by the tool 100. FIG. 13 is an exemplary web-based GUI 1300 for illustrating the budget analysis based on a selection of a "By Category" budget analysis option 1302. The budget analysis can be depicted using a graph 1305, such as a bar graph, column graph, or other suitable graph, and can show analysis results for a specified time frame and member. For example, the GUI 1200 can include a "From" selector 630, a "To" selector 632, the "Name" selector 634, and "Card Holder" selector 636. The "From" selector 630 can identify a point in time after which financial transactions can be included in the budget analysis and the "To" selector 632 can allow the user to choose a point in time before which financial transactions can be included in the budget analysis. As a result, only financial transactions within the range specified by the "Form" and "To" selectors 630 and 632, respectively, are included in the graph 1305. The "Name" selector 634 and/or the "Card" selector 636 allow the user to choose which of the members and/or card numbers associated with the financial unit are included in the budget analysis. For example, the user can choose to include some or all of the members of the financial unit in the budget analysis.

In the present example, the graph 1305 includes merchant categories along the horizontal axis and an amount along the vertical axis. The budget analysis can identify what was budgeted for each category, and the actual spending associated with each category to identify when the spending was over or under budget. In some embodiments, the budget analysis can be displayed in a list form that includes a merchant category, a budgeted amount, an actual spend amount, and a percentage of over or under budget.

Figure 14:
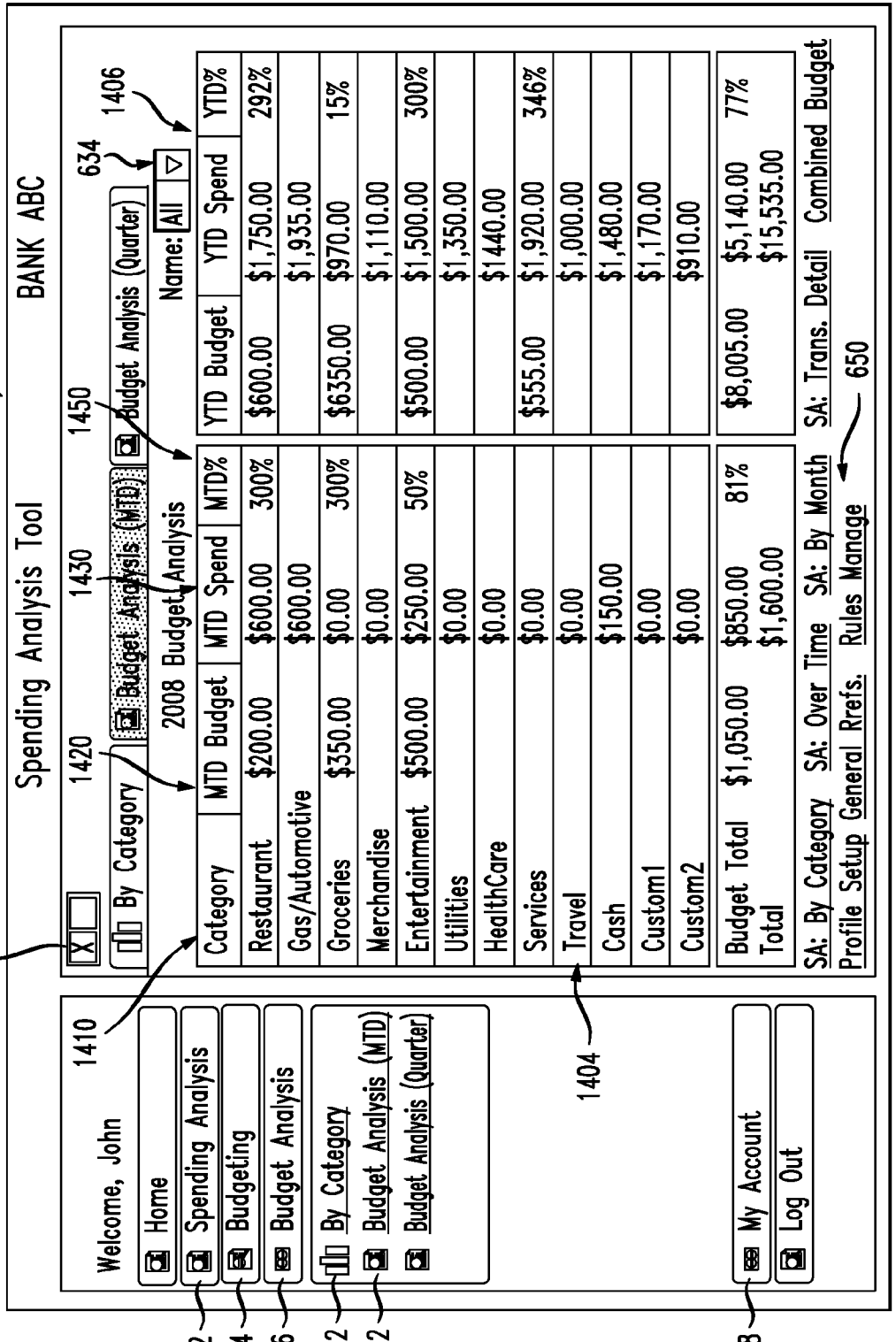

FIG. 14 is an exemplary web-based GUI 1400 for illustrating the budget analysis based on a selection of a "Budget Analysis (MTD)" option 1402. This option provides the user with a budget analysis for the month-to-date in a display section 1404 and the year-to-date (YTD) in a display section 1406. The GUI 1400 can display, for example, the budget by-category, spending by-category, and difference between the spending and budget by-category for the month-to-date, as well as, the overall budget, spending and difference between the budget and spending for each month. For example, the GUI 1400 can include a column 1410 of categories, a column 1420 corresponding to the budget for each category in the month-to-date, a column 1430 corresponding to the spending for each category in the month-to-date, a column 1440 corresponding to the difference between the budget and spending for each category in the month-to-date, and a column 1450 corresponding to the percent difference between the budget and spending for each category in the month-to-date. The user can perform the month-to-date budget analysis for the financial unit or members thereof using the selector 636. FIG. 15 shows a GUI 1500 illustrating a budget analysis when a "Budget Analysis (Quarterly)" option 1502 is selected. The GUI 1500 presents budget analysis results according to the quarter (i.e., three month intervals) in which the financial transactions occur and having a similar general form to the budget analysis for the month-to-date.

Figure 16:
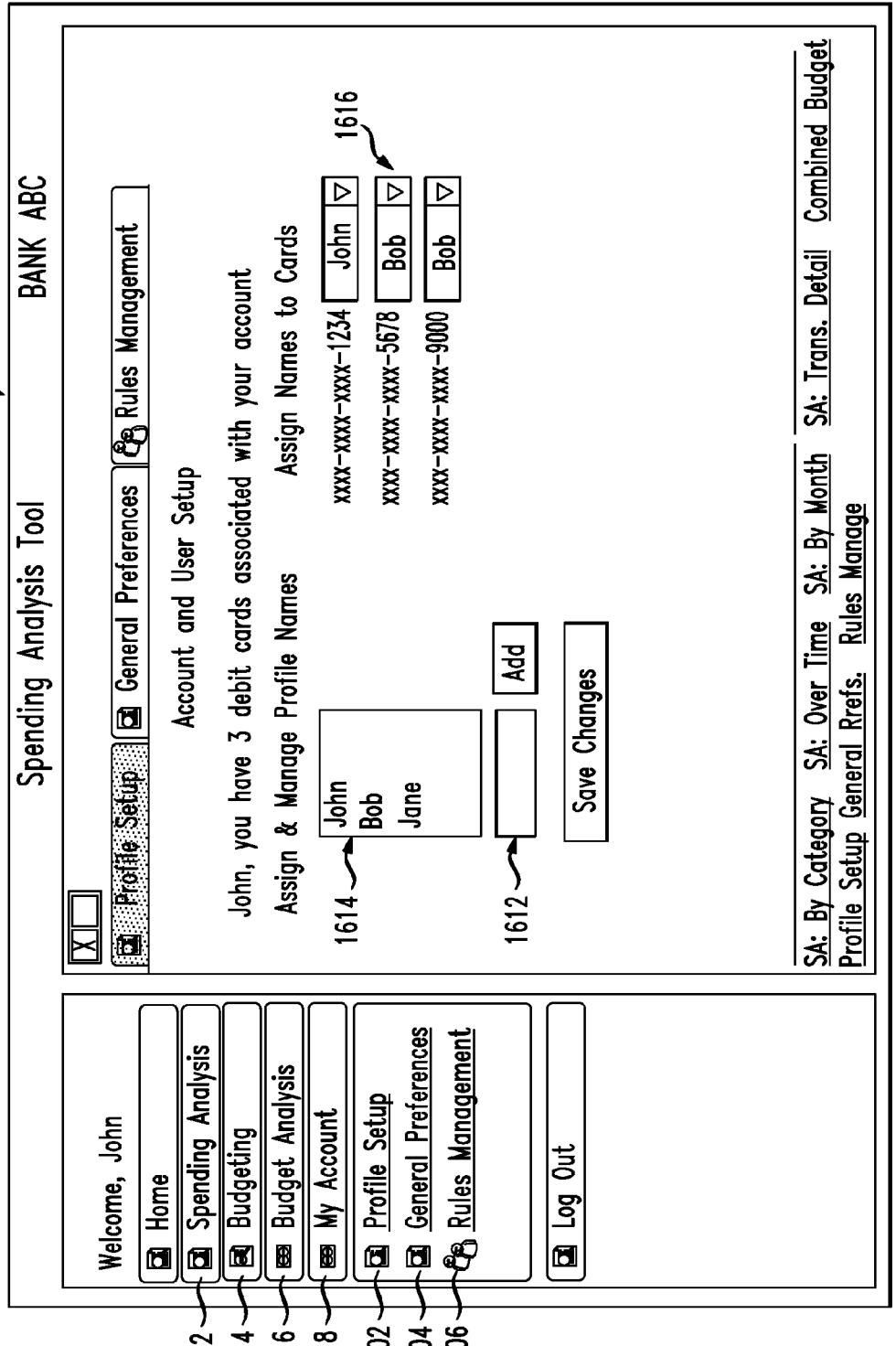

The user can manage the account features by selecting the "My Account" option 518 which once selected displays sub-options including a "Profile Setup" option 1602, a "General Preferences" option 1604, and a Rules Management" option 1606. FIG. 16 shows a GUI 1610 when the Profile Setup option 1602 is selected, FIG. 17 shows a GUI 1700 when the General Preferences option 1604 is selected, and FIG. 18 shows a GUI 1800 when the Rules Management option 1606 is selected.

Referring to FIG. 16, the GUI 1610 can provide an interface that allows the user to manage the financial unit. For example, the GUI 1610 can allow the user to input additional names or entities via an interface 1612, which in the present example is a data entry field. The GUI 1610 can display the names of the individual members of the financial unit in a display field 1614 to allow the user to see which members are included in the financial unit. The GUI 1610 can also include selectors 1616 for assigning members to card numbers that the tool 100 can track spending of individual members. The selectors 1616 can be drop down lists that include the members of the financial unit so that the use can select the member to be associated with a given card number.

Figure 17:
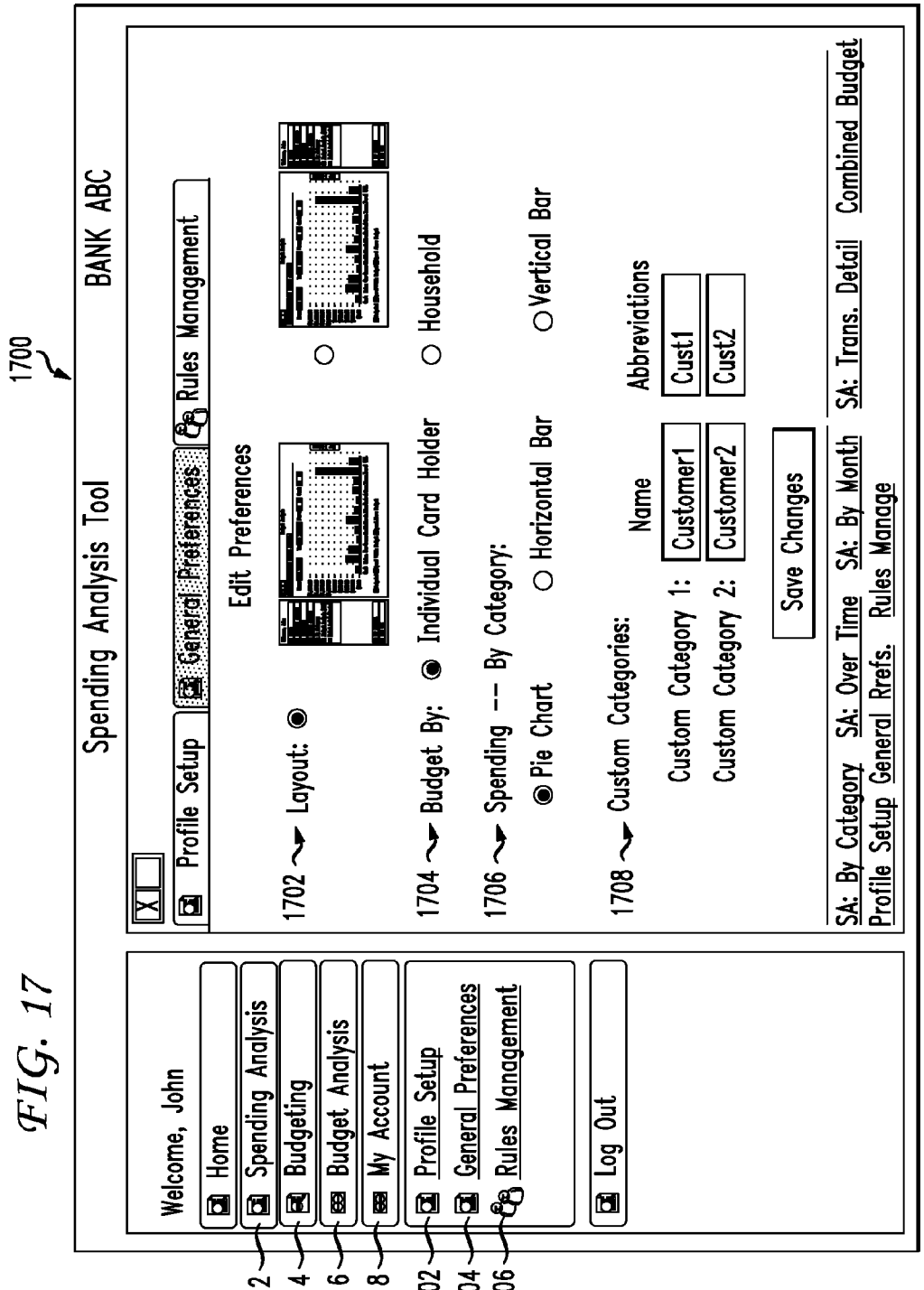

Referring to FIG. 17, the GUI 1700 allows users to manage their preferences. The GUI 1700 can include a layout interface 1702, a budget presentation interface 1704, a spending analysis interface 1706, and a custom categories interface 1708. The layout interface 1702 that allows the user to control the way in which information is arranged in the GUIs. The budget presentation interface 1704, which in the present example can be radial buttons selectable by the user, can allow the user to specify how the budget analysis is presented. For example, the user can specify whether the budget analysis is performed for individual members of the financial unit and/or for the entire financial unit. The spending presentation interface 1706 allows the user to specify a default view to be depicted when the spending analysis is viewed. In the present example, the interface 1706 includes radial buttons for selecting whether the spending analysis is presented in a pie chart, a horizontal bar graph, or a vertical bar graph. The custom category interface 1708 can allow the user to define custom categories for financial transactions. The custom categories interface 1708 can include data entry fields for entering the custom category information. By allowing the customer to define custom categories, the tool 100 can provide the user with the flexibility of identify member specific or financial unit specific financial transaction using their own category.

Figure 18:
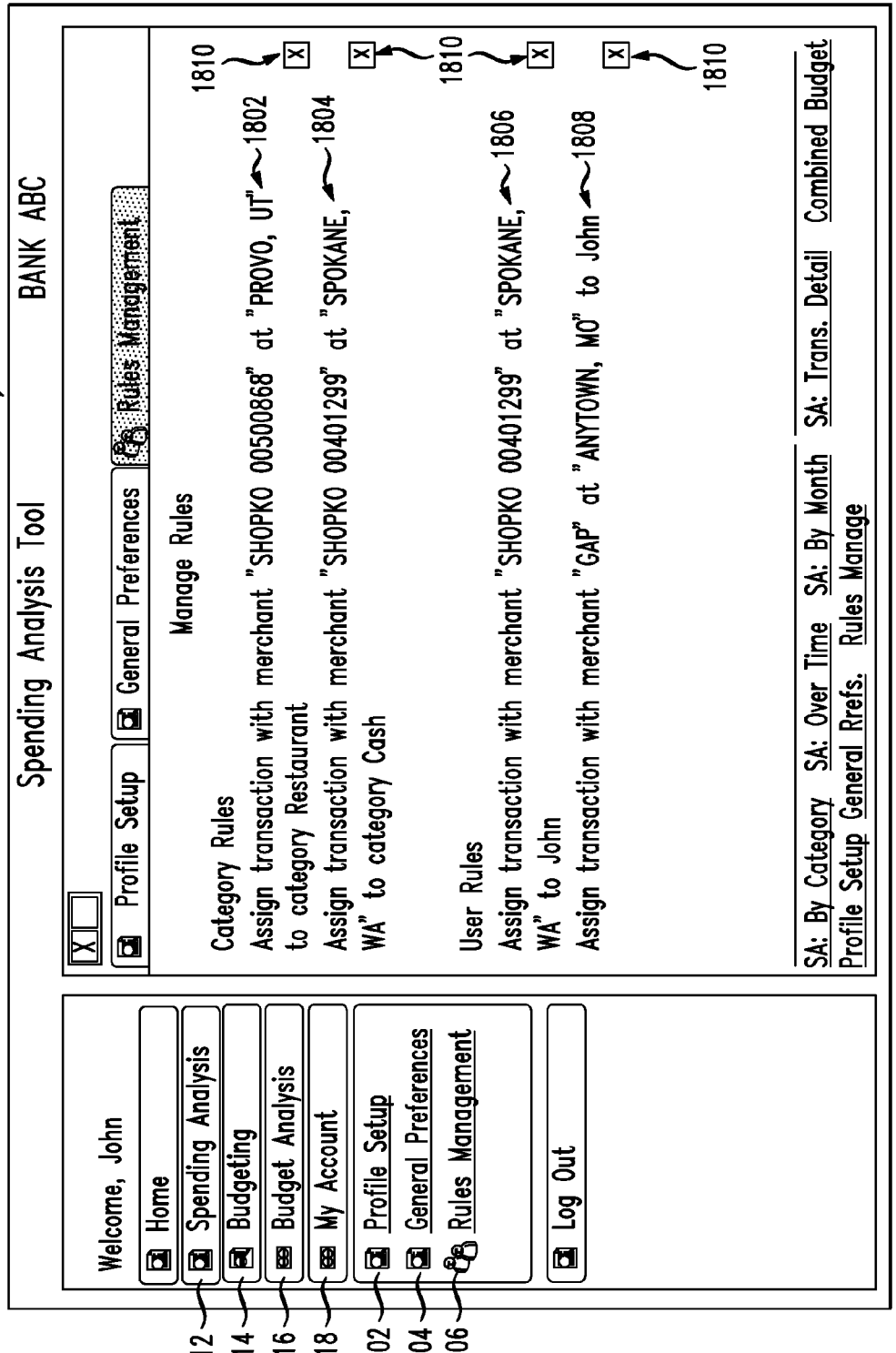

Referring to FIG. 18, the GUI 1800 can display rules implemented by the tool 100. For example, rules can be specified by the tool 100 and/or the user to control the associations between members of the financial unit, merchants, categories, and the like. In one example, when the user changes the associations, as discussed above, a rule can be generated to govern the operation of the tool 100 so that the tool 100 functions in accordance with the rule. The rules can be deleted using the "Delete" selector 1810. When a rule is deleted, the tool 100 can implement default rules.

In the present example, category rules 1802 and 1804 have been created to govern associations between a merchant "SHOPOK" and the categories to which the merchant is assigned and user rules 1806 and 1808 have been created to govern associations between the merchants and members of the financial unit. The rules 1802 and 1804 can be implemented for specific locations of the merchant such that different merchant locations can be assigned to different categories. The rules 1806 and 1808 can associate financial transactions that occur at a merchant location with a specified member of the financial unit so that financial transactions occurring at the specified merchant locations are assigned to the specified member.

Figure 19:
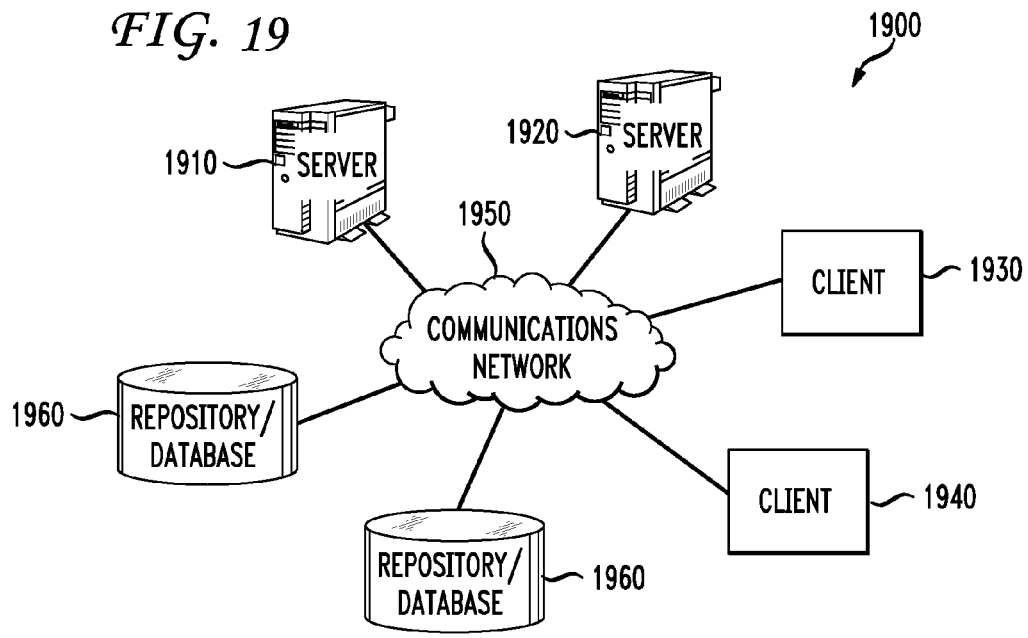
FIG. 19 is a distributed system for implementing embodiments of the present invention.

FIG. 19 depicts a distributed system 1900 for implementing some embodiments of the tool 100. The distributed system 1900 includes one or more servers 1910 and 1920 coupled to clients 1930 and 1940 via a communication network 1950. The servers 1910/1920 and/or the clients 1930/1940 can be computing devices. The distributed system 1900 preferably includes one or more repositories or database 1960, which can be in communication with each other, as well as with the servers 1910 and 1920 and the clients 1930 and 1940, via a communications network 1950.

The servers 1910/1920, clients 1930/1940, and/or databases 1960 can store information, such as components of the tool 100 and/or can store information generated by the tool 100. The tool 100 can be distributed among the servers 1910/1920, clients 1930/1940, and/or databases 1960 such that one or more components of the tool 100 can be located at different devices (e.g. clients, servers, databases) in the communication network 1950. For example, the mapping unit 160 and analysis unit 170 can be implemented by the server 1910, the GUIs can be implemented by the server 1920, and the financial transaction information, budget, and financial unit 110 can be stored and maintained in the database 1960. The client 1930 can include an application for accessing the tool 100 via the GUIs 180.

Figure 20:
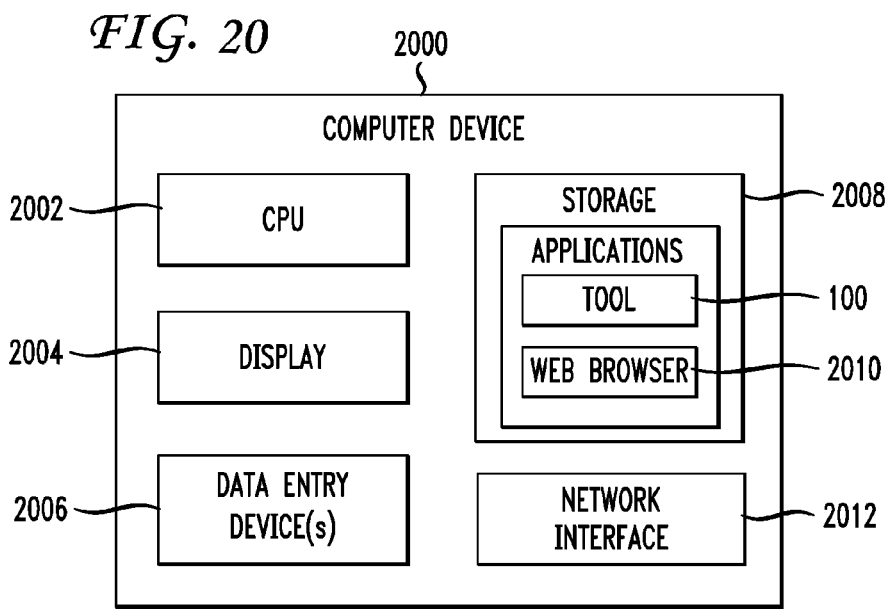
FIG. 20 is a computing device suitable for practicing embodiments of the present invention.

FIG. 20 depicts an exemplary computing device 2000 suitable for practicing the embodiments of the present invention and can be used to implement the servers 1910/1920, the clients 1930/1940, and/or the databases 1960. The computing device 2000 can be a mainframe, personal computer (PC), laptop computer, workstation, handheld device, such as a PDA, a cell phone, or the like. In the illustrated embodiment, the computing device 2000 includes a central processing unit (CPU) 2002 and a display device 2004. The CPU 2002 controls each component of the computing device 2000 to provide components of the tool 100. The display device 2004 enables the computing device 2000 to communicate directly with a user through a visual display and can graphically the GUIs 180. The computing device 2000 can further include data entry device(s) 2006, such as a keyboard, touch screen, mouse, and the like, to allow the user to interact with the tool 100. The computing device 2000 can include storage 2008 for storing information, such as financial transaction information, budget, financial unit 110, and the like. The storage 2008 can include such technologies as a floppy drive, hard drive, tape drive, Flash drive, optical drive, read only memory (ROM), random access memory (RAM), and the like.

Applications 2010, such as the tool 100, or components thereof, can be resident in the storage 2008 when the computing device is implemented as the servers 1910/1920. For embodiments of the computing device 2000 implemented as clients 1930/1940, the computing device 2000 can also include a web browsing application 2012 to allow user to interact with the GUIs 180 of the tool 100. The applications can include code known to those skilled in the art that when executed can be used to implement the tool 100 and/or web browsing application 2012. The code can be composed of at least one of C, C++, Java, JavaScript, Java Applet technology, Basic, Perl, assembly language, machine code, Hypertext Markup Language (HTML), Dynamic Hypertext Markup Language (DHMTL), eXentensible Markup Language (XML), eXtensible Style Language (XLS), Scalable Vector Graphics (SVG), Macromedia's Flash technology, and the like.

The storage 2008 can be local to the computing device 2000 and/or can be implemented remotely as, for example, the databases 1960 accessible by one or more computing devices. The computing device 2000 can also include a network interface 2014 for communicating with a network and can be used for a distributed implementation. The CPU 2002 operates to run the applications, such as the tool 100, in storage 2008 by performing instructions therein and storing information resulting from the performed instructions, which may be graphically depicted via the display 2004.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A method for interactively displaying account activity comprising:
    displaying, via a website, a history of past financial transactions associated with an account for a financial unit by a spending analysis tool implemented using at least one computing device, the past financial transactions being associated with merchants, a first one of the past financial transactions being associated with a first merchant, a first merchant category, and a first member of the financial unit; and
    changing the first member associated with the first one of the past financial transactions to a second member of the financial unit so that the first one of the financial transactions performed by the first member is attributed to the second member of the financial unit in the history.

2. The method of claim 1 further comprising:
    changing the first merchant category associated with the first one of the financial transactions to a second merchant category in the history in response to a selection by a user;
    associating the first merchant with the second merchant category for a subsequent financial transaction involving the first merchant.

3. The method of claim 2 further comprising associating the second merchant category with a specific location of the first merchant so that other locations of the first merchant remain associated with the first merchant category.

4. The method of claim 1, wherein the financial transactions are at least one of a signature transaction and a pin transaction.

5. The method of claim 1 further comprising applying a filter to the financial transactions, the filter limits the financial transactions being used in the analysis to a subset of the financial transactions that are associated with at least one of a member of the financial unit, a selected merchant, and a card number associated with the account.

6. The method of claim 1 further comprising:
    receiving budget information from the user, the budget information identifying a desired amount of spending by at least one of the financial unit, at least one member of the financial unit, and categories of merchants.

7. The method of claim 5 further comprising determining whether spending is over or under a budget.

8. The method of claim 1 further comprising:
    exporting the financial transactions to at least one of a financial management application, spread sheet application, word processor application, and document viewer application.

9. A computer-readable medium comprising instructions, wherein execution of the instructions by at least one computing device facilitates interactively displaying account activity by:
    displaying, via a website, a history of past financial transactions associated with an account for a financial unit by a spending analysis tool implemented using at least one computing device, the past financial transactions being associated with merchants, a first one of the past financial transactions being associated with a first merchant, a first merchant category, and a first member of the financial unit; and
    changing the first member associated with the first one of the past financial transactions to a second member of the financial unit so that the first one of the financial transactions performed by the first member is attributed to the second member of the financial unit in the history.

10. The medium of claim 9, wherein execution of the instructions facilitates interactively displaying account activity by
    changing the first merchant category associated with the at least one of the financial transactions in the history to a second merchant category by the spending analysis tool in response to a selection of a user; and
    associating the first merchant with the second merchant category for a subsequent financial transaction involving the first merchant.

11. The medium of claim 10, wherein execution of the instructions facilitates interactively displaying account activity by associating the second merchant category with a specific location of the first merchant so that other locations of the first merchant remain associated with the first merchant category.

12. The medium of claim 9, wherein execution of the instructions facilitates interactively displaying account activity by applying a filter to the financial transactions, the filter limits the financial transactions being used in the analysis to a subset of the financial transactions that are associated with at least one of a member of the financial unit, a selected merchant, and a card number associated with the account.

13. The medium of claim 9, wherein execution of the instructions facilitates interactively displaying account activity by receiving budget information from the user, the budget information identifying a desired amount of spending by at least one of the financial unit, at least one member of the financial unit, and categories of merchants.

14. A system for interactively displaying account activity comprising:
one or more graphical user interfaces generated by one or more computing devices for displaying, via a website, a history of past financial transactions associated with an account for a financial unit, the past financial transactions being associated with merchants, a first one of the past financial transactions being associated with a first merchant, a first merchant category, and a first member of the financial unit; and
a mapping unit configured to change the first member associated with the second one of the financial transactions to a second member of the financial unit so that the second one of the financial transactions performed by the first member is attributed to the second member of the financial unit in the history,
wherein the one or more graphical user interfaces display the change to the user.

15. The system of claim 14, wherein the mapping unit is configured to change the first merchant category associated with the at least one of the financial transactions in the history to a second merchant category based on a selection of a user and to associate the first merchant with the second merchant category for a subsequent financial transaction involving the first merchant.

16. The system of claim 14 further comprising an analysis unit for performing a spending analysis and a budget analysis, the analysis unit configured to apply a filter to the financial transactions, the filter limiting the financial transactions being used in the analysis to a subset of the financial transactions that are associated with at least one of a member of the financial unit, a selected merchant, and a card number associated with the account.

17. The system of claim 14 further comprising a budgeting unit configured to receive budget information from the user and to generate a budget based on the budget information, the budget information identifying a desired amount of spending by at least one of the financial unit, at least one member of the financial unit, and categories of merchants.

* * * * *

UNITED STATES PATENT AND TRADEMARK OFFICE
CERTIFICATE OF CORRECTION

| | | |
|---|---|---|
| PATENT NO. | : 8,027,891 B2 | Page 1 of 1 |
| APPLICATION NO. | : 12/337176 | |
| DATED | : September 27, 2011 | |
| INVENTOR(S) | : Patricia Preston et al. | |

It is certified that error appears in the above-identified patent and that said Letters Patent is hereby corrected as shown below:

Column 4, line 4, replace "overall some for all financial transactions occurring in a" with --overall sum for all financial transactions occurring in a--.

Column 5, line 64, replace "chart 610 can included embedded links to allow a user to" with --chart 610 can include embedded links to allow a user to--.

Column 6, line 13, replace "actions within the range specified by the "Form" and "To"" with --actions within the range specified by the "From" and "To"--.

Column 8, line 63, replace "within the range specified by the "Form" and "To" selectors" with --within the range specified by the "From" and "To" selectors--.

Signed and Sealed this
Fourteenth Day of February, 2012

David J. Kappos
*Director of the United States Patent and Trademark Office*